(12) United States Patent
Piccat

(10) Patent No.: US 7,143,838 B2
(45) Date of Patent: Dec. 5, 2006

(54) WAVY FARMING DISC

(75) Inventor: Julio Cesar Piccat, Monte Maiz (AR)

(73) Assignee: Ingersoll Argentina S.A., Cordoba (AR)

( * ) Notice: Subject to any disclaimer, the term of this patent is extended or adjusted under 35 U.S.C. 154(b) by 0 days.

(21) Appl. No.: 11/182,274

(22) Filed: Jul. 15, 2005

(65) Prior Publication Data

US 2006/0144600 A1    Jul. 6, 2006

(30) Foreign Application Priority Data

Jan. 4, 2005    (AR) .............................. P050100015

(51) Int. Cl.
*A01B 15/16*    (2006.01)

(52) U.S. Cl. ..................................... 172/604

(58) Field of Classification Search ................ 172/604, 172/599–602, 579, 574, 21, 518
See application file for complete search history.

(56) References Cited

U.S. PATENT DOCUMENTS

| | | | | |
|---|---|---|---|---|
| 323,344 A * | 7/1885 | Dow | ........................... | 172/579 |
| 507,894 A * | 10/1893 | Emans | ........................ | 172/184 |
| 2,575,321 A * | 11/1951 | Traver | ......................... | 172/555 |
| 3,559,748 A * | 2/1971 | Shelton | ...................... | 172/604 |
| 4,256,184 A * | 3/1981 | Squibb | ........................ | 172/531 |
| 4,538,688 A * | 9/1985 | Szucs et al. | ................. | 172/555 |
| 5,649,602 A * | 7/1997 | Bruce | ........................... | 172/604 |
| 5,957,217 A * | 9/1999 | Gunnink | ...................... | 172/166 |
| 6,644,224 B1 * | 11/2003 | Bassett | ......................... | 111/157 |
| 2002/0038620 A1 * | 4/2002 | Gentilhomme | .............. | 111/166 |

* cited by examiner

*Primary Examiner*—Victor Batson
(74) *Attorney, Agent, or Firm*—Norris McLaughlin & Marcus PA

(57) ABSTRACT

A wavy farming disc for working the soil in farming activities, particularly in no-till works for seeding, wherein the disc comprises a plate having a peripheral circular cutting edge and a central portion, and a plurality waves in the plate with the waves extending radially inwardly from the cutting edge and defining a sawtooth pattern.

17 Claims, 2 Drawing Sheets

WAVY FARMING DISC

BACKGROUND OF THE INVENTION

1. Field of the Invention

The present invention relates to the field of the agriculture and farming, more particularly the invention refers to farming tools, such as discs blades, either of the flat or concave/convex type, for working the soil during farming and cultivating works. Even more particularly, the invention relates to a wavy disc, such as a coulter, for use in agricultural machines like cultivators, preferably in no-till implements.

2. Description of the Prior Art

Nowadays it is becoming more and more popular the farming including the use of multiple tools for working the soil with no-tillage before seeding, wherein such tools may include coulters and discs with sharp edges to cut the soil surface and the stubbles in order to open the soil to receive the seeds. These tools are generally mounted on cultivators and planter frames having all the implements to carry out cultivation, preferably the well know no-till cultivation.

For the above mentioned works several designed rotary discs or disc blades including waves and fluted cutting edges are employed to open the desired furrows to which purpose the correct and neat cutting of the stubbles and soil surface is necessary. During the working the discs rotate onto the soil and the waves of the discs cause pieces of soil to move up and jump undesirably out of the furrow thus making the activity very similar to the traditional tillage.

A desired effect of the waves in the blades is that the discs get a gearing coupling with the soil in order to have a better rotation different from the discs with cutting edges having no waves or flutes. With the wavy edges the disc blades rotate better as long as they are more sensitive to the soil surface as well as the pieces of soil are broken under a more energetic action. The waves and flutes in the cutting edges of the discs and coulters produces cuts and shearing in sections that are transverse to the moving direction of the machine what leads to a better handling of the soil surface as well as to an increased specific pressure onto the soil, however these discs cut the stubble and also partially remove too much soil particularly when the wave moves up at a rear part thereof when moving out of the soil surface.

Conventional coulters and discs are provided with different designs and number of waves and flutes but, generally all of the waves and flutes have a general sinusoidal and symmetric design. This is, each wave is comprised of a curve symmetric regarding to a crest or an axis thereof, with and upwardly curved side extending from a valley up to the crest and a curved side downwardly extending from the crest to an adjacent valley. This is basically a curve and a more particularly a sinusoid. In other words those waves or flutes are the result of a logarithmic or exponential function curves.

U.S. Pat. No. 2,908,338 to Hanrahan, discloses a metal made fluted coulter disc with a peripheral cutting edge lying within confines defined between opposite faces of the flutes, with the flutes being illustrated as sinusoidal waves.

U.S. Pat. No. 3,559,748 to Shelton discloses a fluted coulter having a peripheral edge with flutes shown and described as a sinusoidal pattern and a design to provide a substantially circular and straight cutting edge. Finally, U.S. Pat. No. 5,649,602 to Bruce, discloses and illustrates a wavy coulter with a plurality of sinusoidal and symmetric waves extending along respective axis that form an acute angle with the disc radius.

While the above mentioned coulters and discs have shown a better result as compared to the discs and coulters without waves it has been also shown that the same have not complied with the increasing requirements of having more and more accuracy and optimal results in the use of conventional cultivating and seeding machines, particularly no-till implements. In deed, the modern machines are seeking for a more exact and correct cutting of the stubble, for a less mechanical stresses, better and adequate penetration deep of the discs or blades into the soil, as well as a less removal of soil which inconvenient removal is generally a direct result of the use of the waves.

It would be therefore convenient to have a new disc blade or coulter capable of efficiently cutting the soil surface and stubble without inconveniently removing and moving up pieces of soil as well as capable of keeping and conserving a desired humidity in the soil, more particularly a disc or coulter capable of keeping a higher humidity as compared to the result of the discs without waves or flutes.

SUMMARY OF THE INVENTION

It is therefore an object of the present invention to provide a farming disc such as a disc blade or coulter for working the soil in farming activities, preferably in no-till workings, wherein the disc is of the type having at last the periphery thereof provided with waves and flutes with each wave of flute being asymmetric, defining a sawtooth pattern.

It is another object of the present invention to provide a concave/convex disc having a wavy periphery for providing better cutting characteristics as compared to conventional tilling discs, wherein the waves, at least in the periphery of the disc, define an asymmetric pattern such as a sawtooth pattern.

It is still another object of the present invention to provide a wavy farming disc providing a better cutting of the soil and stubble with less mechanical stresses, better penetration with less specific pressure, less removal of soil pieces and better conservation of the furrow in order to keep a better humidity degree of the soil which is a combination of factors for a better cultivation of the seeds, wherein the disc or coulter is provided with peripheral waves or flutes wherein the waves or flutes provide the disc with a general sawtoothed pattern.

It is even another object of the present invention to provide a wavy framing disc comprising a plate having a peripheral circular cutting edge and a central portion, and a plurality of waves in the plate with the waves extending radially inwardly from the cutting edge and defining a sawtooth pattern.

It is still another object of the present invention to provide a coulter disc with a better cutting of the soil and stubble and with less mechanical stresses, better penetration with less specific pressure, less removal of soil pieces and better conservation of the furrow in order to keep a better humidity degree of the soil which is a combination of factor for a better cultivation of the seeds, wherein the coulter comprises a plate having a peripheral circular cutting edge and a central portion, means at the central portion for mounting the coulter disc in a no-till implement, and a plurality of waves in the plate with the waves extending radially inwardly from the cutting edge and defining a sawtooth pattern.

It is even another object of the present invention to provide a wavy disc or coulter as above referred to, wherein the waves have an inwardly radially decreasing depth and the central portion includes means for rotatably mounting the disc in a farming machine, wherein the means for mounting comprises at least one orifice for connecting to the machine, and wherein each wave is defined by an upwardly extending wide side and a downwardly extending slim side, both sides defining an asymmetric crest, with each side being substantially planar and said cutting edge being sharp.

It is even another object of the present invention to provide a wavy farming disc, such as a disc blade or coulter comprising a plate, either of the flat or concave/convex type, having a peripheral circular cutting edge and a central portion, and a plurality of waves in the plate with waves extending radially inwardly from the cutting edge and defining a sawtooth pattern, wherein each wave defines an asymmetric crest extending along a radial axis, or extending along an axis forming an acute angle with a radius of the disc, or extending along a curved axis.

It is even another object of the present invention to provide a wavy farming disc comprising a plate having a peripheral circular cutting edge and a central portion, and a plurality of waves in the plate with the waves extending radially inwardly from the cutting edge and defining a sawtooth pattern, wherein the sawtooth pattern provides a better self sharpening of the cutting edge of the disc or coulter.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
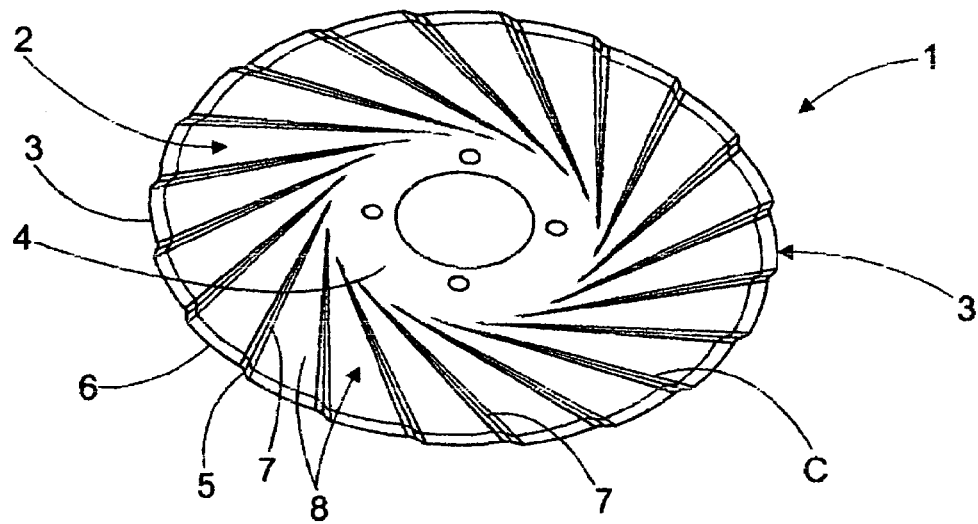
FIG. 1 is a top perspective view of a disc according to an embodiment of the present invention.
Figure 2:
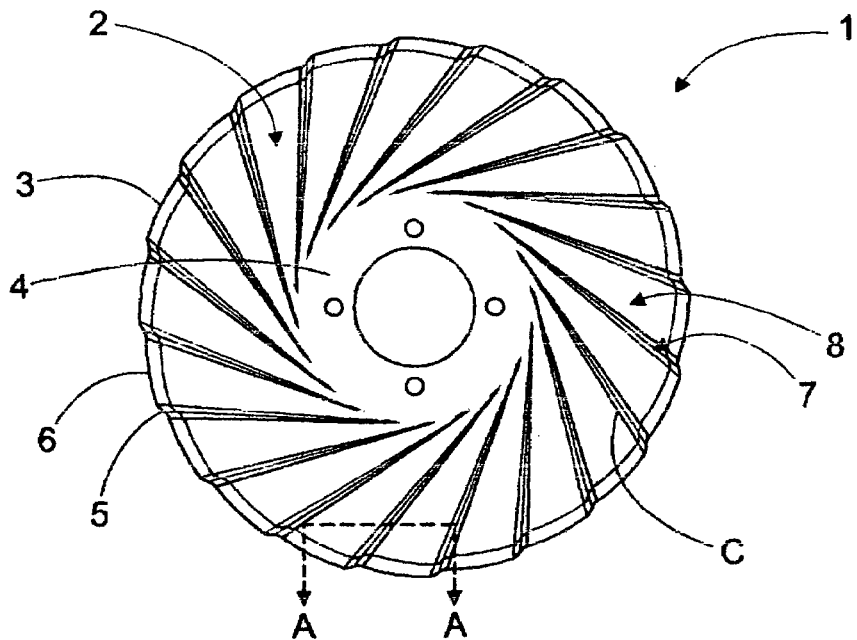
FIG. 2 is a top plan view of the disc of FIG. 1.

Now referring in detail to the drawings it may be seen from FIGS. 1 and 2 a disc blade or simply a disc indicated by general reference number 1, such as a coulter disc, either an entirely flat or planar disc or a well known concave/convex disc. Disc 1 is provided with a plurality of waves 2 that according to the invention have a particular pattern to which reference will be made below. Disc 1 is preferably made of metal, such as iron, steel and other metals and alloys and has a general circular configuration with a peripheral circular cutting edge 3, preferably a sharp edge, and a central portion 4.

Preferably, the waves have an inwardly radially decreasing depth in order to merge into central portion 4 that includes means, such as one or more orifices, for rotatably mounting the disc in a farming machine or implement not shown, preferably a no-till implement. Thus, waves 2 extend radially inwardly from the cutting edge 3 towards the central portion.

Distinctly from the conventional waves or flutes the inventive wavy design has a particular configuration in order to form a sawtooth pattern. More particularly, each wave 2 is defined, as better illustrated in FIG. 3, by an upwardly extending shorter segment 5 and a downwardly extending larger segment 6 in a manner that both segments define an asymmetric crest "C". While reference is made to upwardly 5 and downwardly 6 segments, these physical references are taken according to the view of the disc as illustrated in the cross-section of FIG. 3, however segments 5, 6 may extend inversely, that is downwardly and upwardly respectively. While there is no restriction about the length relationship between segments 5, 6, other than the design restrictions of the disc, preferably, segment 6 is from about 3 to 10 times the length of segment 5 and preferably about 5 to 7 times the length of segment 5. In like manner, the depth Hpp of the waves will depend on the desired design parameters, kind of soil, type of agricultural machine, etc.

Figure 3:
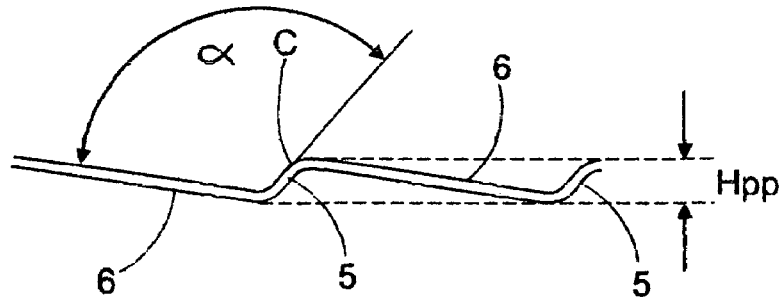
FIG. 3 shows a cross-section taken along cutting lines A—A of FIG. 2.

Segments 5 and 6, shown in FIG. 3, are the cross-sections of corresponding wave slim side 7 and wave wide side 8, respectively. Waves sides 7, 8 are preferably flat or planar with a general triangle configuration. An angle α, as shown in FIG. 3, from about 80° to about 140°, preferably from about 90° to about 130°, and most preferably of about 125°, is defined between both planar sides 7, 8.

The above mentioned asymmetry of the crest resulting from the wide and slim adjacent sides or faces of the wave, provides the wave arrangement with a general saw pattern that have shown an effective performance in the cutting of the soil and stubble. The asymmetric design, providing the sawtooth pattern shown in FIG. 3, have shown a better penetration of the disc into the soil and through the stubble and any crop remainders, as well as it requires less mechanical forces with less stresses to enter the soil and less specific pressure onto the soil. In addition, distinctly from the conventional sinusoidal wavy coulters, the inventive sawtooth design provides less removal of the soil when exiting the soil at the rear part of the disc relative to the moving direction of the machine. The conventional waves cause the disc to remove and expel back or drive out pieces of soil when the rear part of the cutting edge is moving out of the soil. This is prevented by the inventive design and therefore the soil is permitted to keep a higher humidity degree what is better for culturing. Another feature found in connection to the sawtooth design is that the cutting effect is more aggressive and the self sharpening of the edge is better.

Figure 4:
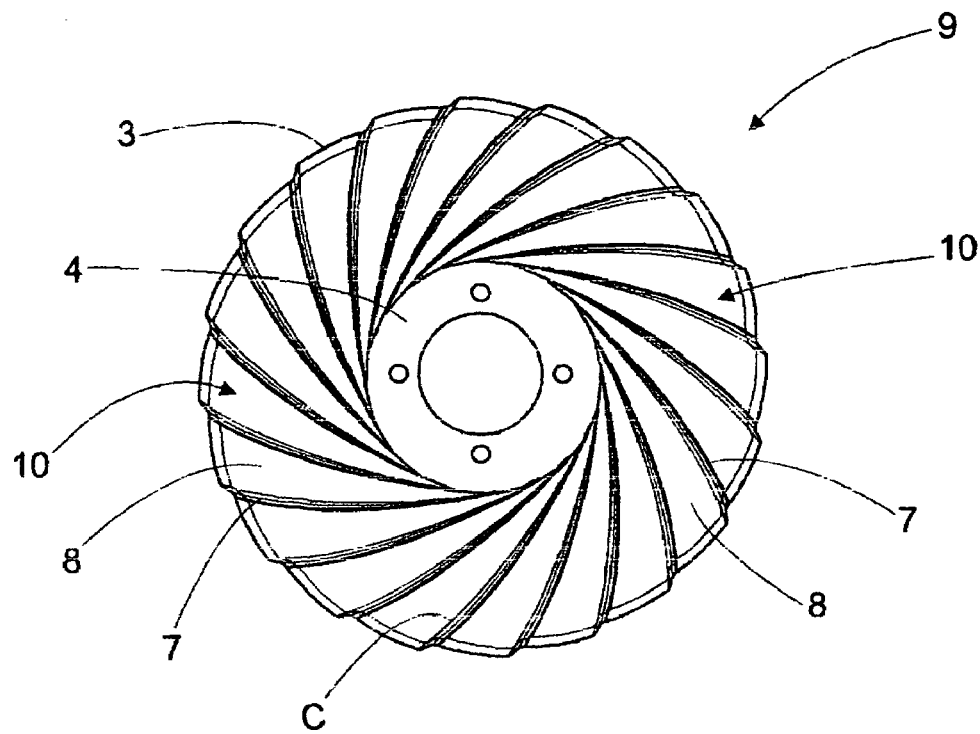
FIG. 4 is a top plan view of another embodiment of the disc of the present invention.
Figure 5:
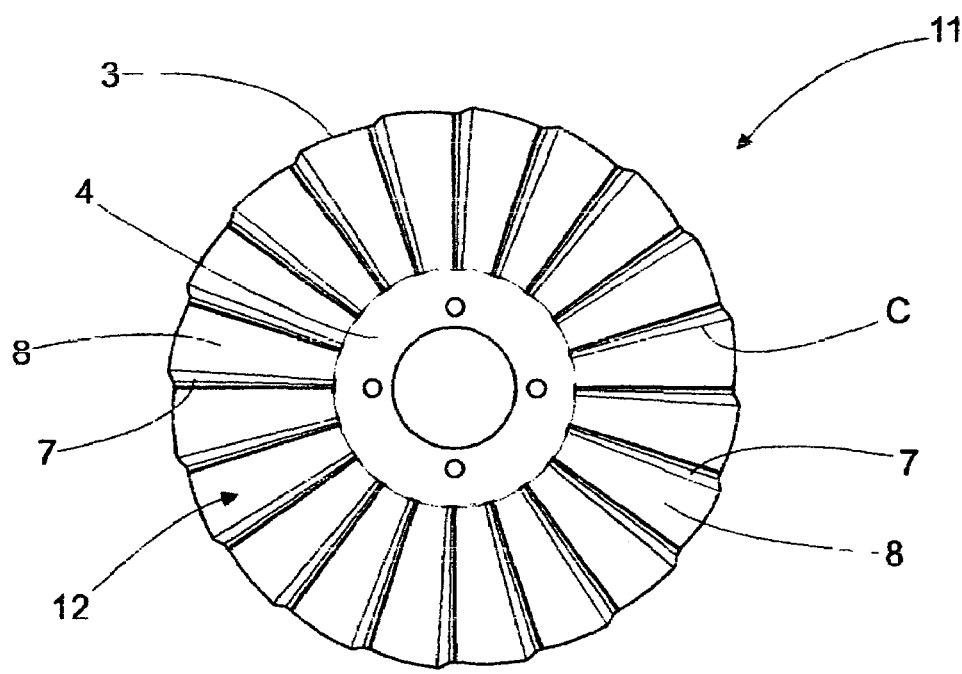
FIG. 5 is a top plan view of still another embodiment of the disc of the present invention.

As illustrated in FIGS. 1, 2, each asymmetric crest C may extend radially along a corresponding axis forming an acute angle with radius, not shown, of the disc. Alternatively, crest C may extend, in a disc or coulter generally indicated by reference 9, along a radially extending curved axis as shown in FIG. 4, forming curved waves 10. According to another embodiment, depicted in FIG. 5, crest C of waves 12 may extend radially coincident with the radius of the disc or coulter 11.

While preferred embodiments of the present invention have been illustrated and described, it will be obvious to those skilled in the art that various changes and modifications may be made therein without departing from the scope of the invention as defined in the appended claims.

I claim:

1. A wavy farming disc comprising:
   a plate having a peripheral circular cutting edge and a central portion, and
   a plurality of waves in the plate with the waves extending radially inwardly from the cutting edge and defining a sawtooth pattern, wherein each wave is defined by a downwardly extending wide side and an upwardly extending slim side, both wide and slim sides defining an asymmetric crest, and wherein the wide side defines a wide segment and the slim side defines a slim segment and the wide segment has a length between 5 to 7 times a length of the slim segment, and wherein the slim side and the wide side defines an angle of about 125°.

2. The disc of claim 1, wherein the waves have an inwardly radially decreasing depth.

3. The disc of claim 1, wherein the central portion includes means for rotatably mounting the disc in a farming machine.

4. The disc of claim 3, wherein the means for mounting comprise at least one orifice for connecting to the machine.

5. The disc of claim 1, wherein each wave side is substantially planar.

6. The disc of claim 1, wherein said cutting edge is sharp.

7. The disc of claim 1, wherein each wave defines an asymmetric crest extending along a radially extending axis.

8. The disc of claim 1, wherein each wave defines an asymmetric crest extending along an axis forming an acute angle with a radius of the disc.

9. The disc of claim 1, wherein each wave defines an asymmetric crest extending along a radially extending curved axis.

10. A coulter disc comprising:
    a plate having a peripheral circular cutting edge and a central portion,
    means at the central portion for mounting the coulter disc in a no-till implement, and
    a plurality of waves in the plate with the waves extending radially inwardly from the cutting edge and defining a sawtooth pattern, wherein each wave is defined by a downwardly extending wide side and an upwardly extending slim side, both wide and slim sides defining an asymmetric crest, and wherein the wide side defines a wide segment and the slim side defines a slim segment and the wide segment has a length between 5 to 7 times a length of the slim segment, and wherein the slim side and the wide side defines an angle of about 125°.

11. The disc of claim 10, wherein the waves have an inwardly radially decreasing depth.

12. The disc of claim 10, wherein the means for mounting comprise at least one orifice for connecting to the machine.

13. The disc of claim 10, wherein the wave side is substantially planar.

14. The concave wavy disc of claim 10, wherein said cutting edge is sharp.

15. The disc of claim 10, wherein each wave defines an asymmetric crest extending along a radially extending axis.

16. The disc of claim 10, wherein each wave defines an asymmetric crest extending along an axis forming an acute angle with a radius of the disc.

17. The disc of claim 10, wherein each wave defines an asymmetric crest extending along a radially extending curved axis.

* * * * *